A. J. SWARTS.
SPRING WHEEL.
APPLICATION FILED JUNE 21, 1911.
1,020,328.
Patented Mar. 12, 1912.
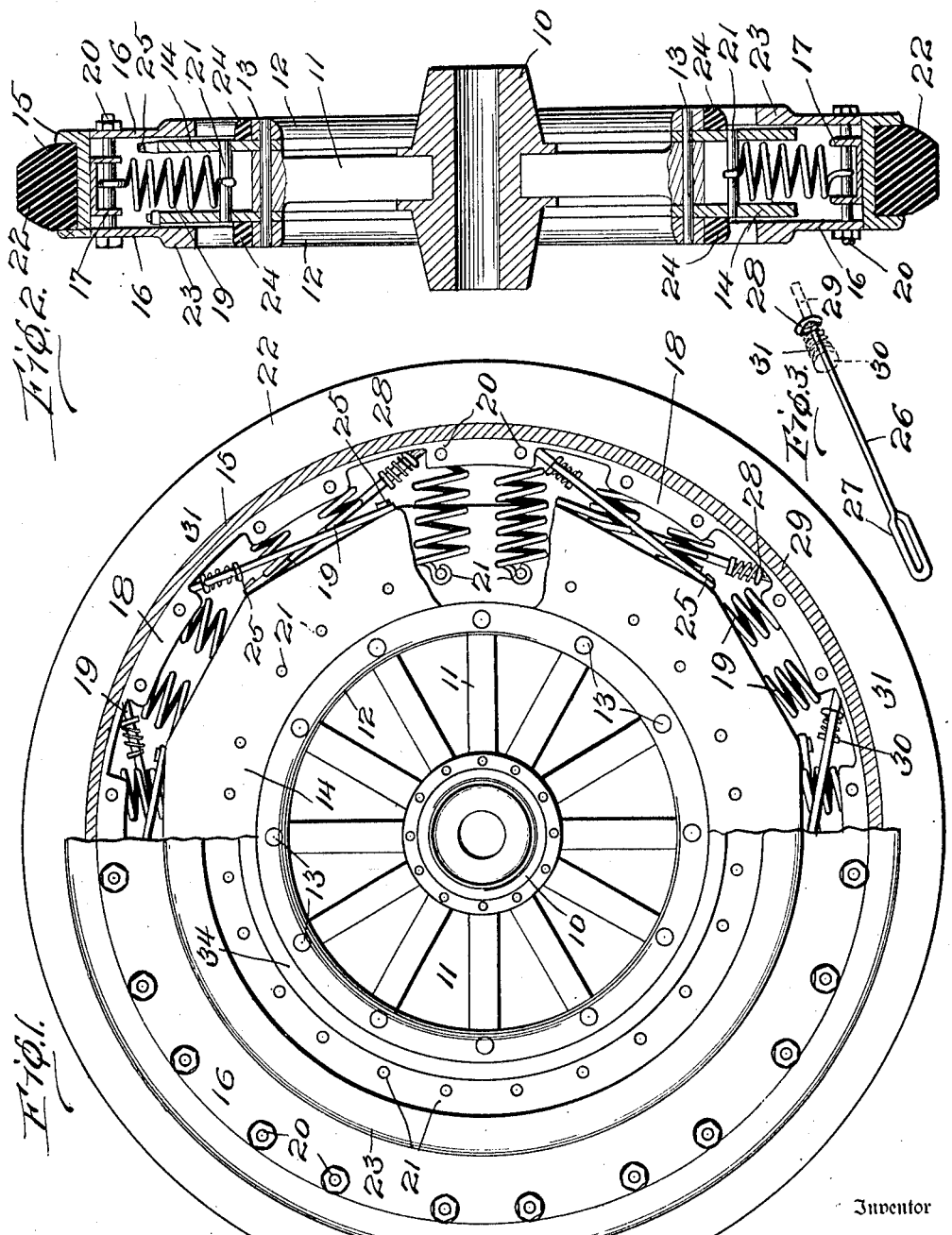
Witnesses
Inventor
A. J. Swarts,
By Mason Fenwick & Lawrence,
Attorneys

UNITED STATES PATENT OFFICE.

AI J. SWARTS, OF KENT, WASHINGTON.

SPRING-WHEEL.

1,020,328.  Specification of Letters Patent.  Patented Mar. 12, 1912.

Application filed June 21, 1911. Serial No. 634,496.

*To all whom it may concern:*

Be it known that I, AI J. SWARTS, a citizen of the United States, residing at Kent, in the county of King and State of Washington, have invented certain new and useful Improvements in Spring-Wheels; and I do hereby declare the following to be a full, clear, and exact description of the invention, such as will enable others skilled in the art to which it appertains to make and use the same.

This invention relates to resilient wheels and has for an object to provide a resilient wheel having improved features of convenience and economy.

A further object of the invention is to provide a resilient wheel composed of normally concentric parts connected by springs and having inclined brace bars disposed between the parts to resist and transmit traction stresses.

A further object of the invention is to provide improved means connected with the hub and other improved means connected with the rim for attaching to the connecting springs.

With these and other objects in view the invention comprises certain novel constructions, combinations and arrangement of parts as will be hereinafter more fully described and claimed.

In the drawings:—Figure 1 is a view of a wheel embodying the present invention, one half being shown in side elevation, the other half with parts broken away. Fig. 2 is a diametrical sectional view of the wheel. Fig. 3 is a perspective view of one of the braces.

Like characters of reference indicate corresponding parts throughout the several views.

The improved wheel which forms the subject matter of this application comprises a hub 10 with spokes 11 radiating therefrom having their extremities connected by rings 12 concentric with the hub and upon each side of the wheel. The spokes are connected with the rings 12 in any approved manner as by the rivets 13. Between the rings 12 and the spokes 11 cheek plates 14 are interposed being substantially concentric with the hub and rings 12.

About the member constructed as above described an outer member is employed comprising a rim member including a channel portion 15 with annular plates 16 fitting somewhat snugly upon the exterior of the cheek plates 14. Between the annular plates 16 a channel member 17 is employed which may be an ordinary channel member curved to fit the inside of the rim member and preferably although not necessarily cut out to produce the ears 18, as indicated at Fig. 1.

Between the rim member constituted as described and the inner member also constructed as before described, springs 19 are disposed having their outer ends secured to the channel 17 by means of bolts 20 and their inner ends secured to the cheek plates by means of bolts or rivets 21. All of the springs 19 which are spaced entirely about the wheel are under tension so that the rim member is held normally yieldingly concentric with the inner or hub member and capable of taking up stresses applied to the hub or to the rim, the latter of which is preferably though not necessarily provided with a tire 22. The annular plates 16 are also provided preferably about their inner edges with upset or enlarged portions 23 while a resilient or cushioning member 24 of rubber or the like is carried about the outer peripheries of the rings 24 so that in excess yielding of the springs 19 the rim member will contact with such resilient or cushioning member to prevent breakage and also sudden and unnecessary jarring.

The wheel, as above described, provides all of the resiliency and yielding required but for a traction wheel it is found that the torque applied to the hub will unnecessarily strain the springs 19. To overcome this objection the cheek plates 14 are provided with bolts or studs 25 upon which are mounted brace bars 26 by means of slots 27 formed in one end of said brace bars which embraces the studs 25, such slot being shown particularly at Fig. 3. At its opposite end each of said brace bars has a ring or eye 28 which embraces a stud 29 carried rigidly by the rim member, such stud being provided with a head 30 and with a spring 31 interposed between the eye 28 and the head 30. With the torque applied to the hub in the direction indicated by the arrow in Fig. 1, the action of the bracing mechanism is to have the stud 25 engage against the extreme end of the slot 27 and to draw the eye 28 against the tension of the spring 31, such description applying to the bracing mechanism on the front or near side of the structure, as shown in Fig. 1. The bracing mechanism shown upon the back or far side in Fig. 1 is the reverse and when the torque is applied as shown at the arrow in Fig. 1 and the bracing mechanism upon the front or near side is placed under stress, the action of the back or far bracing mechanism is that the studs 25 slide loosely in the slot 27. When the torque upon the hub is reversed the resilient strain is applied to the bracing mechanism upon the rear or far side of the structure, as shown at Fig. 1, while the studs 25 slide in the slots in the front or near bracing mechanism.

I claim:—

1. In a spring wheel, a hub member, a rim member, radial springs connecting the members, inclined braces extending from the hub member to the rim member, such braces being provided with slots at one end to permit free movement and at the opposite end with cushioning springs and positive stops.

2. In a spring wheel, a hub member, a rim member, radial springs connecting the members and inclined braces extending from the hub member to the rim member, such braces being provided with slots at one end, pins inserted in the hub member and through the slots, brackets rigidly secured to the rim member and permitting a movement of the inclined braces relative to the rim member, and a spring interposed to cushion a pulling strain exerted upon said brace member.

3. In a resilient wheel, a hub member, pins spaced about the periphery of the hub member, a rim member, brackets spaced about the inner circle of the rim member and corresponding with the pins in the hub member, and pairs of inversely inclined brace members having slots at one end engaging upon the pins of the hub member and slidably and yieldingly engaged upon the brackets at their opposite ends.

In testimony whereof I affix my signature in presence of two witnesses.

AI J. SWARTS.

Witnesses:
G. WARD KEMP,
C. C. PHILLIPS.